(12) United States Patent  (10) Patent No.: US 8,522,213 B2
Fuhrer et al.  (45) Date of Patent: Aug. 27, 2013

(54) DEBUGGER AND DEBUGGING METHODS USING BREAKPOINTS CONDITIONED ON THE STATIC IDENTITY OF DATA

(75) Inventors: Robert M. Fuhrer, Hawthorne, NY (US); Danny Soroker, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 13/106,375

(22) Filed: May 12, 2011

(65) Prior Publication Data

US 2012/0291017 A1 Nov. 15, 2012

(51) Int. Cl.
*G06F 9/44* (2006.01)
(52) U.S. Cl.
USPC .......................................... 717/125; 717/129
(58) Field of Classification Search
USPC ................................................ 717/125, 129
See application file for complete search history.

(56) References Cited

U.S. PATENT DOCUMENTS

| | | | |
|---|---|---|---|
| 5,812,850 A * | 9/1998 | Wimble | 717/131 |
| 5,845,125 A | 12/1998 | Nishimura et al. | |
| 6,769,116 B1 | 7/2004 | Sexton | |
| 6,836,857 B2 * | 12/2004 | Ten-Hove et al. | 714/34 |
| 6,928,449 B2 * | 8/2005 | Ten-Hove et al. | 1/1 |
| 7,506,313 B2 * | 3/2009 | Bates et al. | 717/125 |
| 7,526,754 B2 | 4/2009 | Bentolila | |
| 7,735,069 B2 | 6/2010 | Bustelo et al. | |
| 2003/0079159 A1 * | 4/2003 | Ten-Hove et al. | 714/34 |
| 2008/0010536 A1 * | 1/2008 | Bates et al. | 714/38 |
| 2010/0229159 A1 | 9/2010 | Odaira et al. | |

OTHER PUBLICATIONS

Paul E Roberts, "Implementation and Evaluation of Data Breakpoint Schemes in an Interactive Debugger", Department of Computer Science, The University of Utah, Dec. 1996 (A thesis submitted to the faculty of the University of Utah).

* cited by examiner

*Primary Examiner* — Phillip H Nguyen
(74) *Attorney, Agent, or Firm* — F. Chau & Associates, LLC; William J. Stock (57) ABSTRACT

A method of debugging a program includes setting a breakpoint in the program identifying a location within the program, a reference-typed expression that is valid within the scope of the location, and a set of statically-specified data entities to which the expression refers, upon encountering the location during a current run of the program, determining whether the associated expression evaluates to a reference corresponding to one of the statically-specified data entities, pausing the program at the location if a value of the expression refers to one of the statically-specified data entities, and continuing the program without pausing if the value does not refer to one of the statically-specified data entities.

20 Claims, 6 Drawing Sheets

DEBUGGER AND DEBUGGING METHODS USING BREAKPOINTS CONDITIONED ON THE STATIC IDENTITY OF DATA

BACKGROUND

1. Technical Field

The present disclosure generally relates to software debuggers and methods of debugging software, and more particularly to a debugger and a debugging method that uses conditional breakpoints.

2. Discussion of Related Art

A debugger or a debugging tool is a computer program that is used to test and debug a target program. A "crash" may happen when the target program cannot normally continue because of a programming bug. For example, the program may have attempted to use an unavailable instruction or to access unavailable or protected memory. When the program "crashes" or reaches a preset condition, the debugger may show the position in the original code if it is a source-level debugger or symbolic debugger.

Debuggers may also offer more sophisticated functions such as running a program step by step (single-stepping), or by stopping or pausing (breaking) the program to examine the current state at some event or specified instruction by means of a breakpoint. A breakpoint can be absolute or conditional. An absolute breakpoint may identify a line number within a target program where a break in the execution of the program will occur when that line has been reached. A conditional breakpoint additionally includes a condition that needs to be satisfied before the break occurs. For example, the breakpoint could be conditioned on a variable of the program having a certain value.

When debugging object-oriented and imperative software, one is often interested in focusing on the behavior of a piece of code with respect to some specific data entity with which the code interacts. For example, it may be important to focus on behavior with respect to data entities that belong to some other piece of code, by virtue of being allocated at some particular program point. However, this focus cannot be achieved with ordinary conditional breakpoints, because the point at which an object was allocated cannot be identified by examining the object. Further, achieving this focus can be particularly challenging when debugging software that makes use of a complex software framework.

A software framework is an abstraction in which common code providing generic functionality can be selectively overridden or specialized by user code, thus providing specific functionality. Frameworks are a special case of software libraries in that they are reusable abstractions of code wrapped in a well-defined Application Programming Interface (API), yet they contain some distinguishing features that separate them from normal libraries. For example, a framework may have a default behavior, be non-modifiable, have inversion of control, or extensibility. Inversion of control allows the overall program's flow of control to be dictated by the framework instead of the caller. Extensibility allows a framework to be extended due to selective overriding by a user or specialized by user code providing a specific functionality.

Developers debugging software that uses a given framework may resort to tracing through the framework to understand the framework's behavior, and how it relates to their code. Unfortunately, setting a breakpoint at a particular line of source code within a framework often results in the debugger stopping many times at that line, on behalf of entities created or owned by framework clients other than the one of interest. As a result, it can become difficult to focus on the interactions between client code and framework code.

BRIEF SUMMARY

According to an exemplary embodiment of the disclosure, a method of debugging a program includes setting a breakpoint in the program identifying a location within the program, an expression within the scope of the location, and a set of statically-specified data entities to which the expression refers, upon encountering the location during a current run of the program, determining whether the associated expression evaluates to a reference corresponding to one of the statically-specified data entities, pausing the program at the location if a value of the expression refers to one of the statically-specified data entities, and continuing the program without pausing if the value does not refer to one of the statically-specified data entities. The method may be performed by a data processing system, a processor, etc. The expression may be a reference-typed expression whose value refers to a data entity that is dynamically allocated by the program. The expression may be valid when the expression refers only to literal values and variables.

According to an exemplary embodiment of the disclosure, upon encountering a current line of a program identified by a breakpoint, determining whether an expression of the current line evaluates to a reference corresponding to a statically-specified data entity identified by the breakpoint, pausing the program at the location if a value of an expression of the breakpoint refers to the statically-specified data entity, and continuing the program without pausing if the value does not refer to the statically-specified data entity. The method may be performed by a data processing system, a processor, etc. The expression may be a reference-typed expression whose value refers to a data entity that is dynamically allocated by the program.

According to an exemplary embodiment of the invention, an apparatus for debugging a program includes a memory and a processor. The memory stores at least one target program, a debugging program, and a user interface program. The processor is configured to execute the selected target program and the debugging program. The user interface program enables a user to select one of the target programs for debugging, and set a breakpoint in the program identifying a location within the program, a reference-typed expression that is valid within a scope of the location, and a set of statically-specified data entities to which the expression refers. The debugging program determines whether the associated expression evaluates to a reference corresponding to one of the statically-specified data entities, pauses the target program at the location if a value of the expression refers to one of the statically-specified data entities, and continues the target program without pausing if the value does not refer to one of the statically-specified data entities.

BRIEF DESCRIPTION OF THE SEVERAL VIEWS OF THE DRAWINGS

Exemplary embodiments of the disclosure can be understood in more detail from the following descriptions taken in conjunction with the accompanying drawings in which.

DETAILED DESCRIPTION

Exemplary embodiments of the disclosure relate to an instance-identity-constrained breakpoint for use in methods of debugging software programs and software debuggers. For example, the breakpoint may include i) a source location (e.g., a source line, or an entry point of a program entity such as a method or subroutine), and optionally, (ii) a set of reference-typed expressions that refer to entities within the scope of the location, and (iii) for each specified expression in (ii), a corresponding set of statically-specified data instances. An example of an breakpoint in an object-oriented context with reference to the program of FIG. 4 includes (i) the entry point of a method of an object class (e.g., Foo.execute( ), (ii) a singleton set (e.g., "the receiver 'this' of Foo.execute( )", and (iii) a singleton allocation site set (e.g., "line 3 of Client1").

Herein, the types of the data references whose identities are being constrained are referred to as "constrained types". In the object-oriented context, the type containing the source location (i) is referred to as the "owning type". Further, if the location in question is within an instance method, the object instance on behalf of which a given method executes is referred to as the "receiver".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Figure 1:
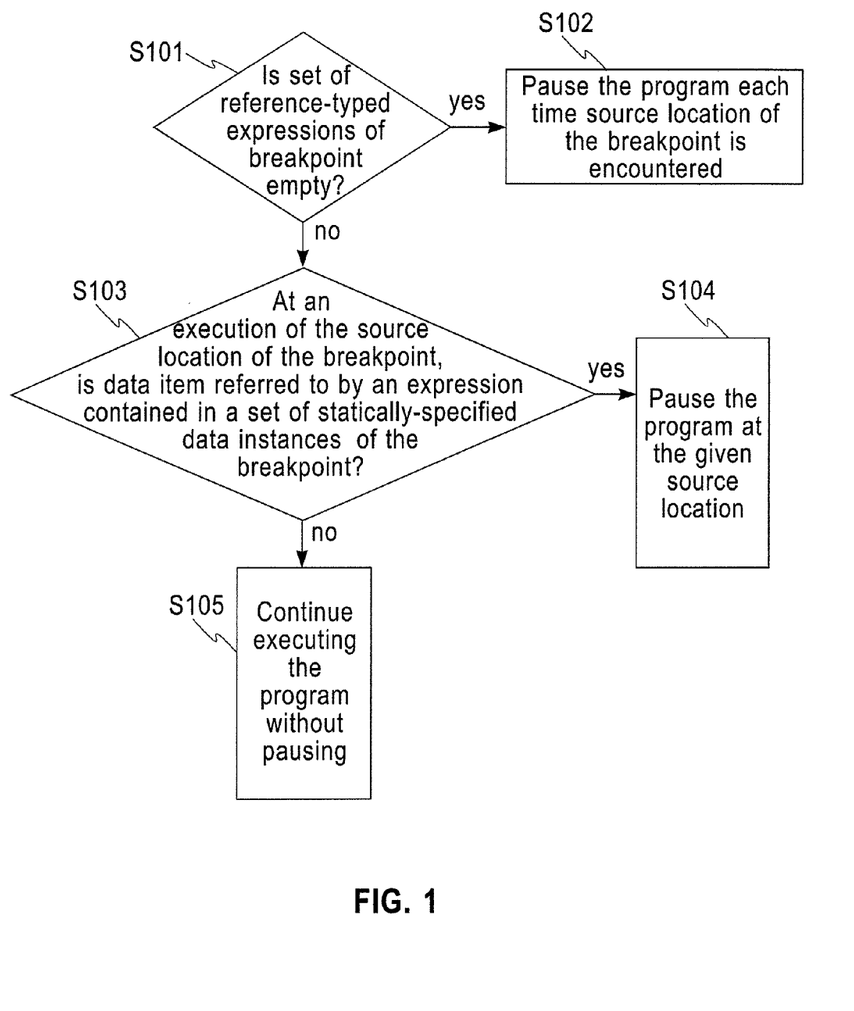
FIG. 1 illustrates a high-level flow chart for a method of debugging software according to an exemplary embodiment of the disclosure.

A debugger that supports the breakpoint according to an exemplary embodiment of the disclosure may execute the method of FIG. 1. Referring to FIG. 1, the method includes determining whether a set of reference-typed expressions of a breakpoint are empty (S101), pausing the program each time a source location of the breakpoint is encountered if the set is empty (S102), and if the set is not empty, at an execution of the given source location, determining if a data item referred to by one of the expressions is contained in a set of statically-specified data instances of the breakpoint (S103), pausing the program at the given source location if the expression is determined to be contained in the set of statically-specified data instances (S104), and continuing to execute the program without pausing if the expression is determined not be contained within the set of statically-specified data instances (S105). The set of reference-typed expressions may be one or more expressions. The set of statically-specified data instances may be one or more data instances.

Figure 2:
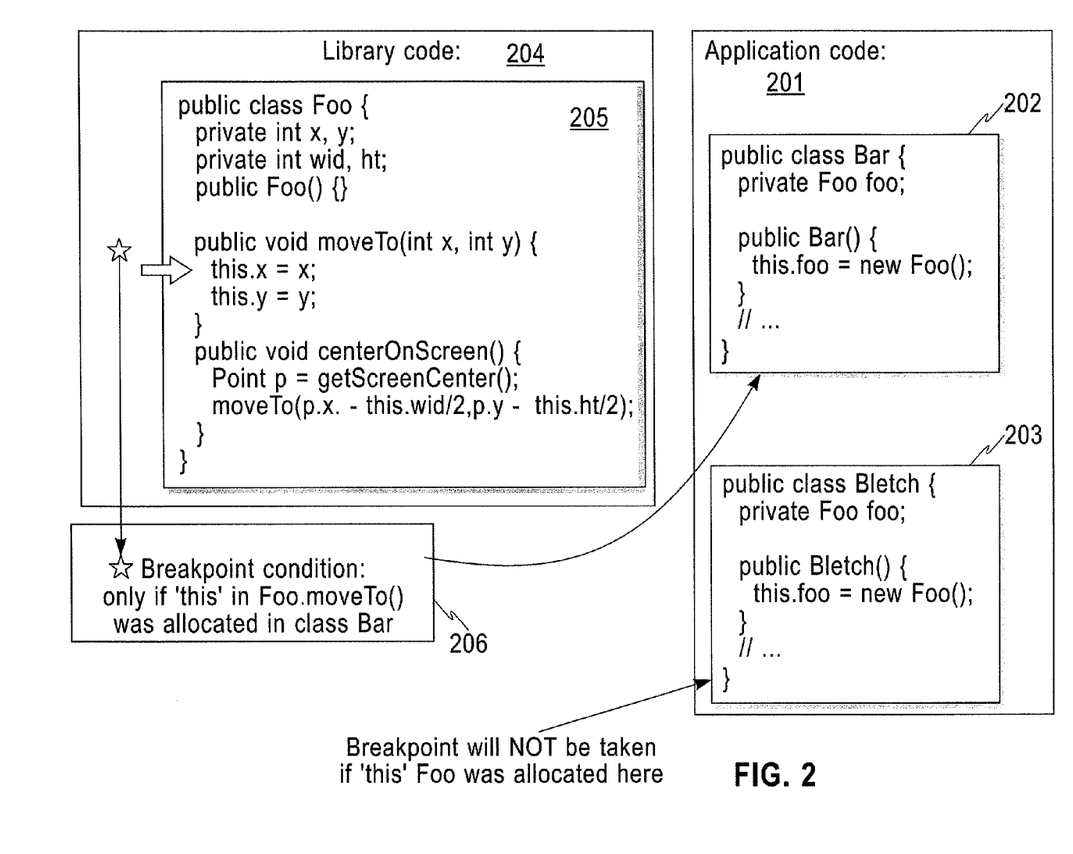
FIG. 2 illustrates an exemplary program that includes a breakpoint that is set according to an exemplary embodiment of the disclosure.

FIG. 2 illustrates an example, where a breakpoint 206 according to an exemplary embodiment of the disclosure is set in a line of a library code 204 including a Foo class 205 and application code 201 including a Bar class 202 and a Bletch class 203 that both allocate instances of the Foo class 205. Referring to FIG. 2, the breakpoint 206 includes an exemplary breakpoint condition that breaks at the line labeled with an arrow only when the 'this' variable in the Foo.moveTo( ) method was allocated in the Bar class 202. For example, as shown in FIG. 2, both the Bar class 202 and the Bletch class 203 of the application code 201 allocated an instance of Foo using a call to new Foo( ) method. Here, the breakpoint 206 will only be taken when the Foo was allocated by Bar class 202 since the breakpoint condition refers to Bar and does not refer to Bletch.

The set of statically-specified data instances can be specified in various ways. For example, the set of data instances can be specified as a set of allocation site locations in the program. For example, the data instances can be specified as the locations in the source/object code of the program where the data of interest are allocated. In another embodiment, a condition is specified on the state of the program at the time allocation occurs, which can refer to any data in scope at the allocation site.

As an example of an allocation-site based specification for object oriented programs, each source location (and therefore a given breakpoint) may be associated with a single type (e.g., an object class). Thus, relevant allocation sites for a breakpoint that constrain the identity of 'this' are those that allocate the type of object associated with that breakpoint (e.g., the "owning type" of that source location"). Due to type inheritance, there may be multiple concrete types (e.g., those that can be instantiated) that correspond to the "owning" type at any given execution of the line associated with the breakpoint. For example, if the owning type is a base class, which is extended by several derived types, any allocation of any class that extends the owning type is potentially relevant.

For breakpoints that constrain the identity of some other object reference at the breakpoint location, useful allocation sites are those that allocate objects of the type of the object reference. Again, due to type inheritance, there may be multiple concrete types that could correspond to the type of the object reference. For example, if the object reference is of an interface type, any allocation of any class that implements the given interface is potentially relevant.

In languages that are not object-oriented, but do support dynamic memory allocation (e.g., procedural languages such as Pascal), the set of allocation sites may be specified as a set of source locations where the given type of data is allocated.

At least one exemplary embodiment of the disclosure relates to a debugger or a debugging method that uses a static specification of a breakpoint's identity conditions to instrument one or more potentially relevant allocations (e.g., instantiations) of a data entity (e.g., object) to record information about events where the data entity was allocated. For example, upon encountering a line of code with an associated identity breakpoint, the debugger uses the specification to determine whether the data entity referred to by a data reference (e.g., a variable) was allocated at "sites of interest" associated with the breakpoint.

The sites of interest can be specified in various ways, including as a set of one or more of any of the following: i) single source locations (e.g., a line number of source code at which instances of the relevant type (e.g., class) are allocated), ii) the set of sites of interest contained within a given type, iii) the set of sites of interest contained within a given compilation unit, iv) the set of sites of interest contained within a given package or module, v) the set of sites of interest contained within a given library or other software bundle, or vi) a condition that constrains the circumstances under which a given object constructor or allocation site is executed. For example, the condition could place constraints on the contents of a call stack, such as "any call to constructor Foo(int) in which the Bar( ) method of class (e.g., type) Bar 202 appears as a caller in the call stack").

A debugger supporting such a condition breakpoint keeps track of where the relevant data entities (e.g., object instances) were allocated. For example, the debugger could maintain an allocation table. However, for languages that are strictly statically type safe (e.g., Java and Pascal), the debugger need not track the allocation of all types of data. Rather, the debugger need only track allocations of the "constrained types" associated with one or more existing breakpoints. Moreover the debugger can perform this bookkeeping by means of an additional set of breakpoints and a small amount of housekeeping data.

For strictly-statically type-safe languages, the debugger instruments the allocations sites of interest (e.g., those associated with such a conditional breakpoint) by adding instructions that maintain the set of data instances of interest ("the instance set"). For example, as each such allocation site, the debugger adds instructions to add the newly created object instance to the "instance set" associated with a given breakpoint. When the program then reaches the source location associated with that breakpoint, the debugger compares the identity of the referred data to the identities of the data in the associated instance set. Since object-oriented runtimes may have a very concise way of identifying objects (e.g., as either an index into an object table or as a starting address of a memory block occupied by the object instance), this comparison can be made more efficient by use of hashing. Accordingly, it may be possible to avoid a linear search through the instance set (e.g., N objects, where N is a natural number).

However, in languages that are not statically type-safe (e.g., various procedural languages like "C"), it may not be possible to statically limit the set of allocation sites that can result in data that could be referred to by a given data reference. In the "C" language, for example, the ability to unsafely down-cast pointers permits one to treat a pointer to any type of data as any other type. As a result, it may be necessary to instrument all allocation sites so that the site at which each data item was allocated is known.

Figure 3:
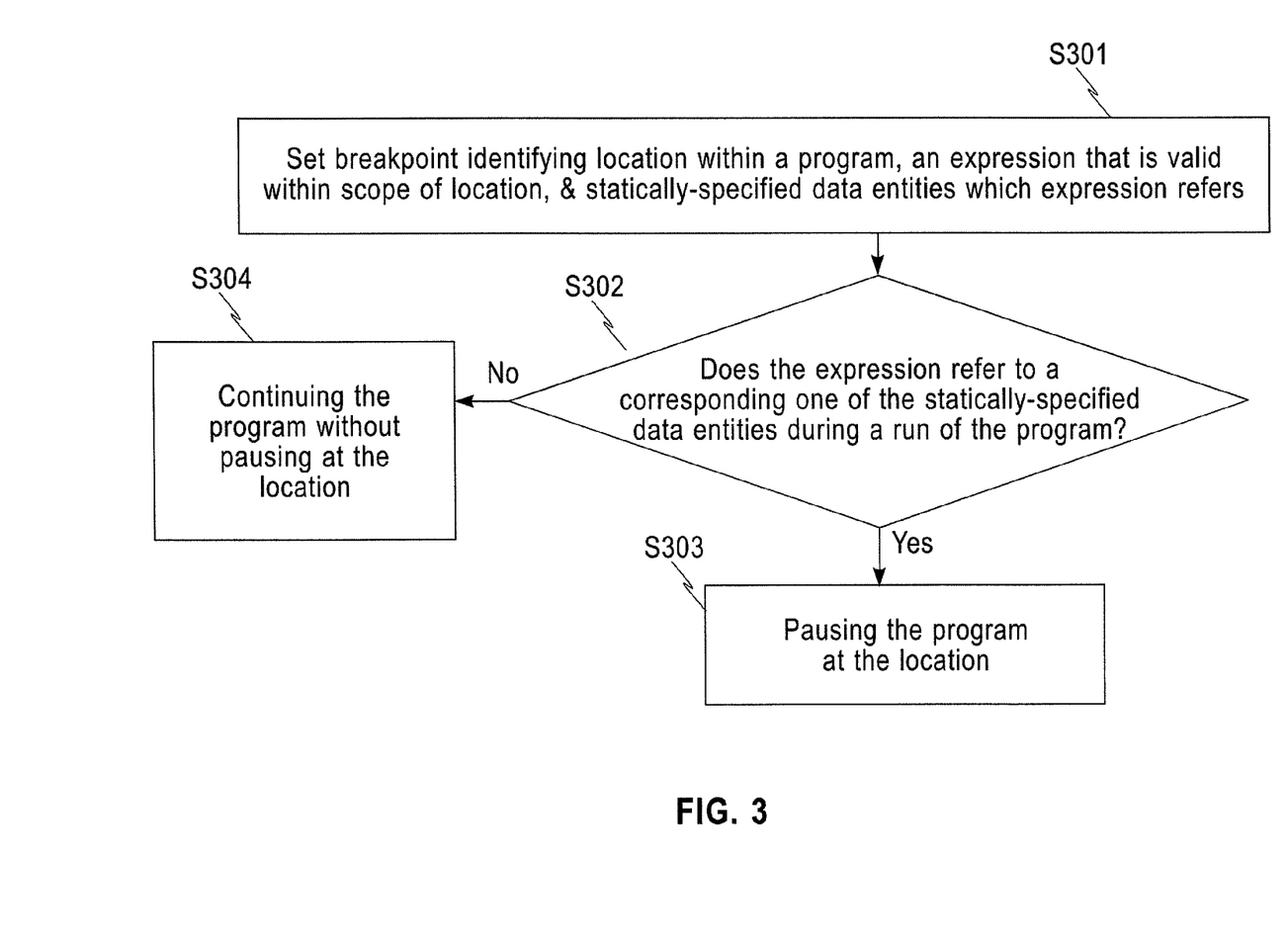
FIG. 3 illustrates a high-level flow chart for a method of debugging software according to an exemplary embodiment of the disclosure.

FIG. 3 is a high-level flow chart of a method for debugging a program according to an exemplary embodiment of the disclosure. Referring to FIG. 3, the method includes setting a breakpoint identifying a location within a program, an expression (e.g., a reference-typed expression) that is valid within the scope of the location, and a set of statically-specified data entities which the expression refers (S301), determining whether the location refer to a corresponding one of the statically-specified data entities during a run of the program (S302), pausing the program at the location if it does refer (S303), and continuing the program without pausing at the location otherwise (S304).

As an example, the location may be a line of code within the program or an entry point of a program entity. The statically-specified data entities could be instances of corresponding object classes. For example, the breakpoint could identify the statically-specified data entities by including names of the object classes that allocate the instances or names of object methods that allocate the instances. As another example, the breakpoint could identify the statically-specified data entities by including names of files that allocate the data entities. As a further example, the breakpoint could identify the statically-specified data entities by including names of libraries or modules that allocate the data entities.

According to an exemplary embodiment of the disclosure, prior to determining whether the value refers to a corresponding one of the statically specified data entities, for each allocation of the expression, an object identifier and a stack backtrace of the allocation may be recorded as an entry in a table. The determining of whether the value refers to a corresponding one of the statically specified data entities may include steps of determining an object identifier of an object to which the value refers, determining the entry in the table that includes the object identifier, and determining that the value refers to one of the statically-specified data entities if the stack backtrace of the entry refers to any allocation location associated with the statically-specified data entities. The value does not refer to one of the statically-specified data entities if the stack backtrace does not refer to any allocation location associated with the statically-specified data entities.

Figure 4:
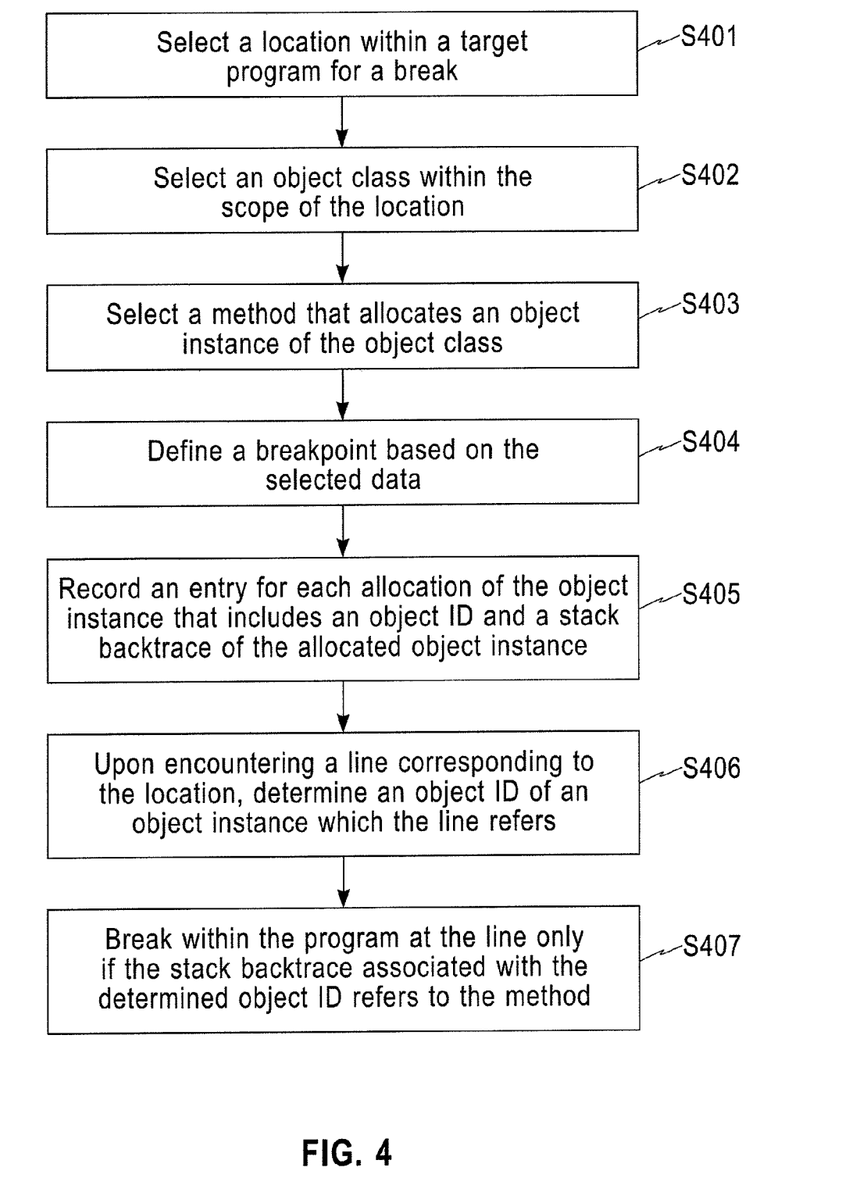
FIG. 4 illustrates a high-level flow chart for a method of debugging software according to an exemplary embodiment of the disclosure.
Figure 5:
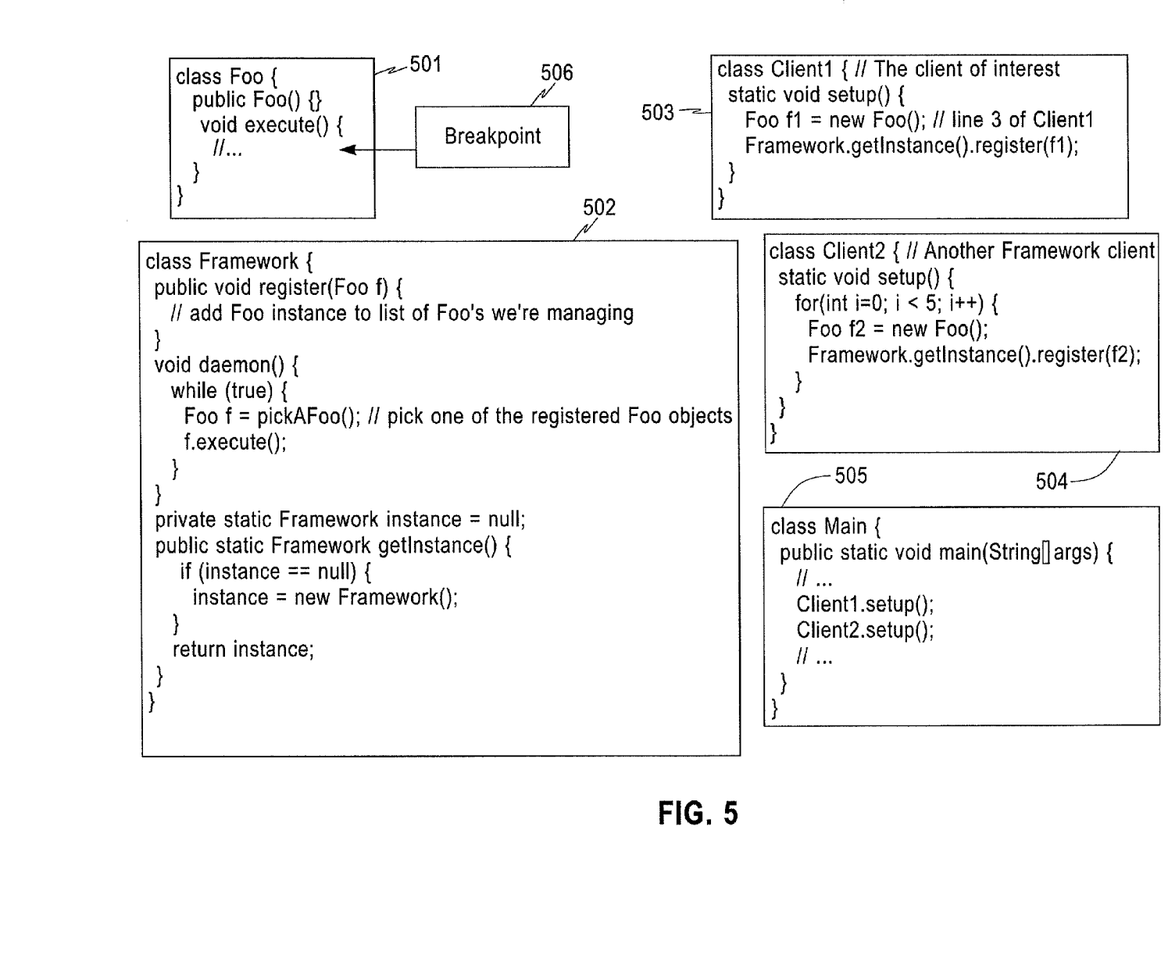
FIG. 5 illustrates an exemplary program that includes a breakpoint that is set according to an exemplary embodiment of the disclosure.
Figure 6:
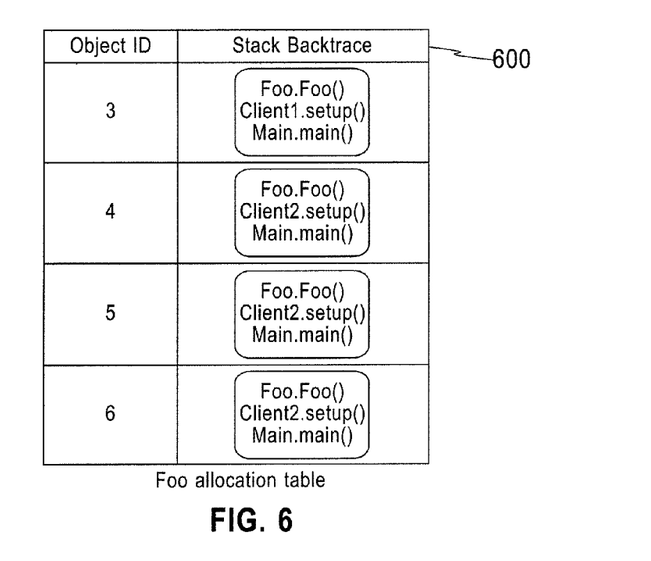
FIG. 6 illustrates an exemplary allocation table that may be used by any of the above methods, according to an exemplary embodiment of the disclosure.

FIG. 4 is a high-level flow chart of a method for debugging a program according to an exemplary embodiment of the disclosure. FIG. 5 illustrates exemplary java classes, which may be operated on by the method of FIG. 4 as an example. FIG. 6 illustrates an object instance allocation table that may be created and used by the method of FIG. 4 as an example.

Referring to FIG. 5, the classes include a Foo class 501, a Framework class 502, a Client1 class 503, a Client2 class 504, and a Main class 505. In this example, the main( ) method of the Main class 505 calls the Client1.setup( ) method and the Client2.setup( ) method. The Client1.setup( ) method allocates a first instance of the Foo class 501 and registers it with the Framework class 502. The Client2.setup( ) method executes a small loop, repeatedly allocating second through sixth instances of the Foo class 501, and registers each with the Framework class 502. As a result, the Framework class 502 manages instances of the Foo class 501 on behalf of both Client1 and Client2.

If an ordinary breakpoint is set within the execute( ) method within the Foo class 501, the breakpoint would be triggered for Foo instances allocated by both Client1 and Client2, which makes it difficult to focus on only a single client's (e.g., only Client 1 or only Client2) interactions with the Framework Class 502.

Accordingly, at least one embodiment of the disclosure provides a means of focusing attention on client/framework interactions by making a breakpoint conditional on the identity of a given data item. For example, in at least one embodiment of the disclosure, the breakpoint is made conditional on the identity of one or more data items in a routine or a method call, so that the debugger will stop (or pause) at such a breakpoint only when the data items belong to a given set of object instances.

Referring to FIG. 4, a location within a target program for a break is selected (S401). For example, as shown in FIG. 5, it is assumed that a user has selected a breakpoint 506 at a source line location within the execute( ) method of the Foo class 501.

Next, an object class within the scope of that location is selected (S402). For example, the user selects the Foo class 501 since it is within the scope of the execute( ) method.

Next, a method (e.g., of another object class) that allocates an object instance of the selected object class is selected (S403). As shown in FIG. 5, the Client1.setup( ) method of the Client1 class 503 and the Client2.setup( ) method of the Client 2 class 504 both allocate an object instance of the Foo class 501 (e.g., see new Foo( ) method in classes 503 and 504). For the purpose of this example, it is assumed that the user is only concerned with allocations of the Foo class 501 by Client1.setup( ) method. Thus, here, the user would select the Client1.setup( ) method as the selected method.

Next, the breakpoint 506 is generated based on the selected data (S504). For example, the breakpoint 506 may include the source line location, an item referring to or an expression identifying the selected object class (e.g., "Foo"), and an item referring to or an expression identifying the selected method (e.g., "Client1.setup( )").

The breakpoint 506 may be structured as a boolean condition (e.g., "stop if 'this' refers to an instance of the class Foo allocated by a call from the method Client1.setup( )"). The Boolean condition could be thought of has a Boolean function, that takes a stack backtrace and returns true if the breakpoint should be "taken". So, in this example, if a given allocation backtrace contains any frame that refers to Client1.setup( ) the function would return true.

Next, based on the selected object class (e.g., Foo) of the breakpoint 506, an entry for each allocation of the object class (e.g., Foo) is recorded that includes the object ID and the stack backtrace of the corresponding object instance (S405). For example, allocations of Foo are recorded because the breakpoint 506 refers to Foo. These recordings occur while the program is run.

FIG. 5 shows an example of part of a recording that may occur when the main( ) method in the Main class 505 is executed. In this example, a Foo allocation table 600 is generated with several entries, where each entry includes an object ID of an allocated FOO and its corresponding stack backtrace. For example, the first entry corresponds to a FOO object instance allocated by the Client1.setup( ) method of the Client1 class 503 and the remaining entries correspond to some of the FOO object instances allocated by the Client2.setup( ) method of the Client2 class 504. The stack backtraces of FIG. 6 show what series of method calls resulted in a Foo allocation. For example, when an instance of the Main class 505 was allocated, the Main.main( ) method called the Client1.setup( ) method, which in turn called the Foo.Foo( ) method, which corresponds to the stack backtrace of the first entry in the table 600 associated with Client1. Next, the Main.main( ) method called the Client2.setup( ) method, which in turned called the Foo.Foo( ) method, which corresponds to the stack bracktraces of the second through fourth entries (note the fifth and sixth entries are not shown) in the table 600 associated with Client2.

A debugger running the above method can place a breakpoint in the constructor of the Foo class 501 to assist in the recording of these entries. For example, when the breakpoint within the constructor is hit, the debugger can query for the object ID (e.g., examine the 'this' variable), retrieve its corresponding stack backtrace, and add the queried items (e.g., the object ID and corresponding stack backtrace) as an entry of the allocation table.

Next, while the program is currently run or after the program is re-run, and upon encountering a line corresponding to the previously selected location, a determination of an object ID of an object instance with which the encountered line refers is made (S406). For example, the debugger may examine the value of the 'this' variable to determine the object ID.

Next, a break occurs within the program at the encountered line only if the stack backtrace associated with the determined object ID refers to the method in the breakpoint. (S407). Here, the breakpoint specified that the method was Client1.setup( ). Thus, if the determined object ID happened to be 3, a break would occur at the encountered line since the backtrace in table 600 associated with an object ID of 3 refers to Client1.setup( ). Alternately, if the determined object ID happened to be 4, a break would not have occurred at the encountered line, since the backtrace in table 600 associated with object ID 4 did not refer to the Client1.setup( ) method, and instead referred to the Client2.setup( ) method. The breakpoint may be referred to as an instance-identity-constrained breakpoint since its occurrence was dependent on the identity of the object instance (e.g., object ID).

Figure 7:
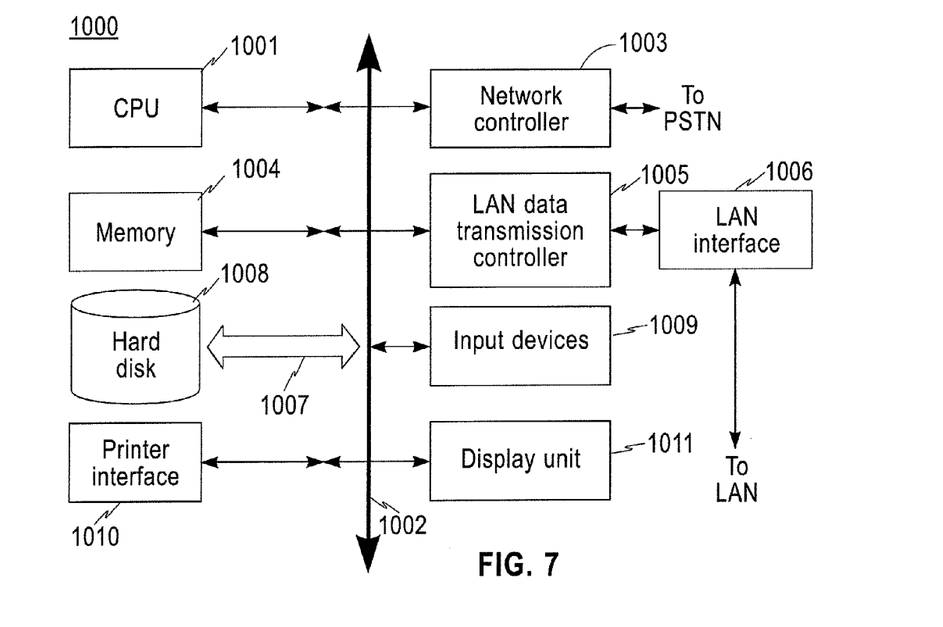
FIG. 7 is shows an example of a computer system capable of implementing the methods according to embodiments of the disclosure.

FIG. 7 illustrates an example of a computer system, which may execute any of the above-described methods, according to exemplary embodiments of the disclosure. For example, the methods of FIGS. 1, 3 and 4 may be implemented in the form of a software debugger running on the computer system. Examples of the computer system include a mainframe, personal computer (PC), handheld computer, a server, etc. The software application may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. The display unit 1011 may display results of the debugging. As shown, the system 1000 may be connected to a data storage device, for example, a hard disk 1008, via a link 1007. CPU 1001 may be the computer processor that performs the above described methods (e.g., those of FIGS. 1, 3 and 4).

In at least one embodiment of the invention, the memory 1004 may store a target program, a debugging program, and a user interface program. The CPU 1001 (e.g., a processor) may execute the selected target program and the debugging program. The CPU 1001 may also execute the user interface program or a processor remote to the system may execute the user interface program. The user interface program enables a user to select one of the target programs for debugging. The user interface program enables the user to set a breakpoint in the program identifying a location within the target program, a reference-typed expression that is valid within a scope of the location, and a set of statically-specified data entities to which the expression refers. The debugging program determines whether the associated expression evaluates to a reference corresponding to one of the statically-specified data entities, pauses the target program at the location if a value of the expression refers to one of the statically-specified data entities, and continues the target program without pausing if the value does not refer to one of the statically-specified data entities. The user interface program may enable the user to examine (view) the content of at least one memory location of the memory 1004 when the program is paused (e.g., program variables, memory locations outside the program, etc.). The user interface program may enable the user to view code of the line of the program at the paused location and code of one or more surrounding lines. Further, the user interface may enable the user to view the code of other lines of the program or external programs that are invoked by the viewed lines. Moreover, the user interface may enable the user to view the content of program variables associated with each viewed line.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of debugging a program, the method comprising:
    setting a breakpoint in the program identifying i) a location within the program, ii) a reference-typed expression that is valid within a scope of the location, and iii) a statically-specified data entity to which the expression refers;
    upon encountering the location during a current run of the program, determining, by a processor, whether the associated expression evaluates to the statically-specified data entity;
    pausing the program at the location if a value of the expression refers to the statically-specified data entity; and
    continuing the program without pausing if the value does not refer to the statically-specified data entity.

2. The method of claim 1, wherein the reference-typed expression is an expression whose value refers to a data entity that is dynamically allocated by the program.

3. The method of claim 1, wherein the expression is valid when the expression refers only to literal values and variables.

4. The method of claim 1, wherein the location is a line of code within the program or an entry point of a program entity.

5. The method of claim 1, wherein the referenced-typed expression is an expression whose value refers to an object class and the statically-specified data is an instance of the object class.

6. The method of claim 5, wherein the breakpoint identifies the statically-specified data entity by including a name of the object class that allocates the instance.

7. The method of claim 5, wherein the breakpoint identifies the statically-specified data entity by including a name of an object method that allocates the instance.

8. The method of claim 1, wherein the breakpoint identifies the statically-specified data entity by including a name of a file that allocates the data entity.

9. The method of claim 1, wherein the breakpoint identifies the statically-specified data entity by including a name of a library that allocate the data entity.

10. The method of claim 1, wherein prior to determining whether the value refers to the statically specified data entity, an object identifier and a stack backtrace of an allocation of the expression is recorded as an entry in a table.

11. The method of claim 10, wherein determining whether the value refers to the statically specified data entity comprises:
    determining an object identifier of an object to which the value refers;
    determining the entry in the table that includes the object identifier; and
    determining that the value refers to the statically-specified data entity if the stack backtrace of the entry refers to any allocation location associated with the statically-specified data entity.

12. The method of claim 11, further comprising determining that the value does not refer to the statically-specified data entity if the stack backtrace does not refer to any allocation location associated with the statically-specified data entity.

13. The method of claim 10, wherein the table is a hash table.

14. A method of debugging a program, the method comprising:
    upon encountering a current line of a program identified by a breakpoint, determining, by a processor, whether an expression within a scope of the current line evaluates to a reference corresponding to a statically-specified data entity identified by the breakpoint, wherein a value of the expression refers to a data entity dynamically allocated by the program;
    pausing the program at the location if a value of an expression of the breakpoint refers to the statically-specified data entity; and
    continuing the program without pausing if the value does not refer to the statically-specified data entity.

15. The method of claim 14, wherein the expression is valid when the expression refers only to literal values and variables.

16. The method of claim 14, wherein a value of the expression refers to an object class and the statically-specified data entity is an instance of the corresponding object class.

17. The method of claim 14, wherein prior to determining, for each allocation of the expression, an object identifier and a stack backtrace of the allocation are recorded as an entry in a table.

18. An apparatus for debugging a program, the apparatus comprising:
    a memory for storing at least one target program, a debugging program, and a user interface program;
    a processor configured to execute the selected target program and the debugging program,
    wherein the user interface program enables a user to select one of the target programs for debugging, and set a breakpoint in the program identifying i) a location within the program, ii) a reference-typed expression that is valid within a scope of the location, and iii) a statically-specified data entity to which the expression refers, and
    wherein the debugging program determines whether the associated expression evaluates to a reference corresponding to the statically-specified data entity, pauses the target program at the location if a value of the expression refers to the statically-specified data entity, and continues the target program without pausing if the value does not refer to the statically-specified data entity.

19. The apparatus of claim 18, wherein the user interface program enables the user to examine the content of at least one memory location of the memory when the program is paused.

20. A method of debugging a program, the method comprising:
    setting a breakpoint in the program identifying a first location within the program, a reference-typed expression that is valid within the scope of the location, and a set of statically-specified data entities to which the expression refers, wherein for each allocation of the expression an object identifier and a stack backtrace of the allocation are recorded as an entry in a table;
    upon encountering the location during a current run of the program, determining, by a processor, whether the associated expression evaluates to a reference corresponding to one of the statically-specified data entities;
    determining an object identifier of an object to which a value of the expression refers;
    determining the entry in the table that includes the object identifier;
    determining that the value refers to one of the statically-specified data entities if the stack backtrace of the entry refers to a second location associated with the statically-specified data entities;
    pausing the program at the first location if the value is determined to refer to the one statically-specified data entity; and
    continuing the program without pausing if the value is not determined to refer to the one statically-specified data entity.

* * * * *